United States Patent
Kestler

[15] 3,650,032
[45] Mar. 21, 1972

[54] MAGNETIC TOOL-POSITIONING APPARATUS

[72] Inventor: Ralph Kestler, Houston, Tex.
[73] Assignee: Glynn E. Perkins
[22] Filed: Feb. 11, 1970
[21] Appl. No.: 10,326

[52] U.S. Cl. .................................................. 32/11, 32/40
[51] Int. Cl. .......................................................... A61c 13/00
[58] Field of Search .......................... 32/40, 11, 67; 249/205; 18/5.7

[56] References Cited

UNITED STATES PATENTS 3,277,576  10/1966  Kraft .......................................... 32/40
3,461,562  8/1969   Cooper ........................................ 32/40
2,669,780  2/1954   Mann .......................................... 32/67

*Primary Examiner*—Robert Peshock
*Attorney*—Michael P. Breston

[57] ABSTRACT

An apparatus for positioning one or more magnetic tools relative to a workpiece. The apparatus includes a base and a magnetic table movably supported relative to the base. Indexing means are provided to roughly position and index the magnetic table. A workpiece-support table is rotatably mounted on the base and is positioned to receive a magnetic tool carried by the magnetic table. The apparatus finds particular utility in the dental art for making replica of teeth.

13 Claims, 6 Drawing Figures

Ralph Kestler
INVENTOR

BY Michael P. Breston

ATTORNEY

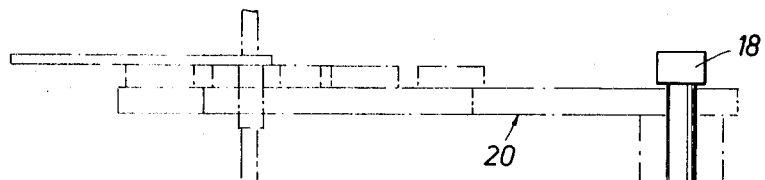
FIG. 3
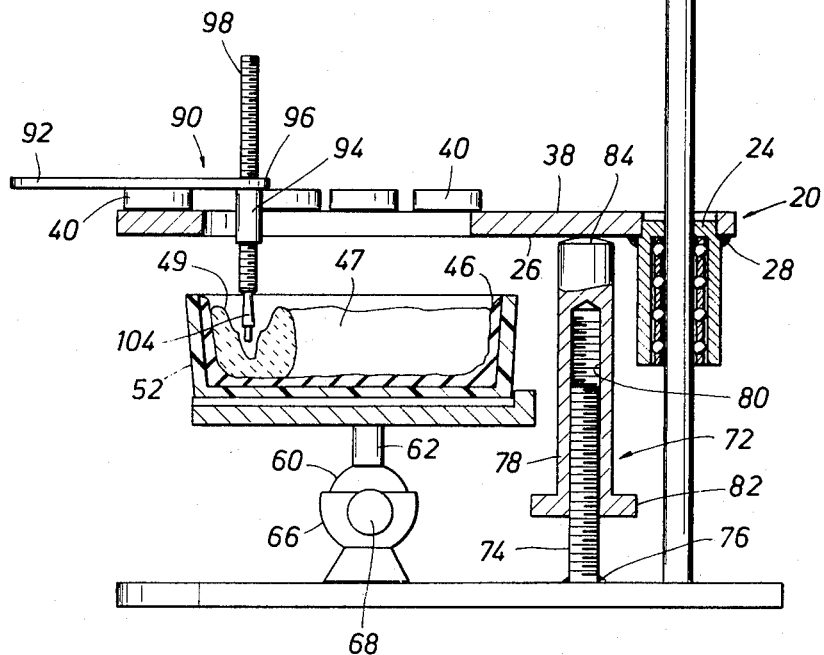
FIG. 5
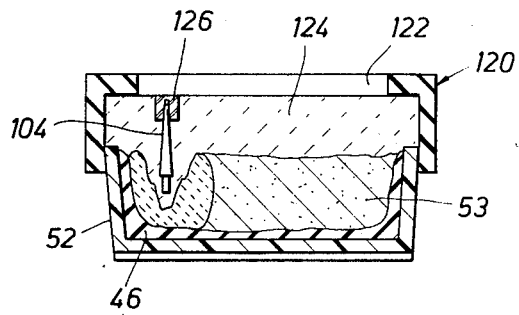
FIG. 4
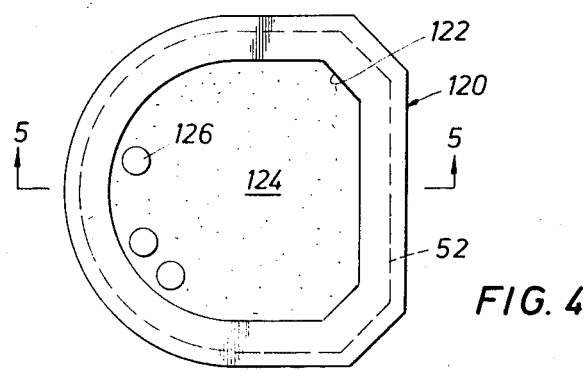
FIG. 6
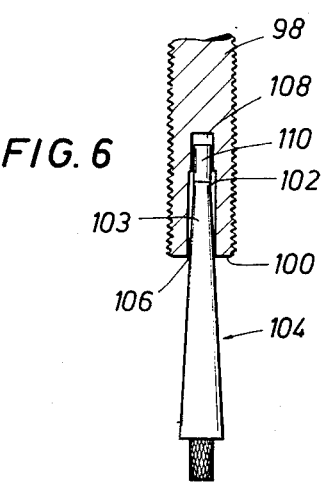
Ralph Kestler
INVENTOR
BY  Michael P. Breston
ATTORNEY 3,650,032

MAGNETIC TOOL-POSITIONING APPARATUS

BACKGROUND OF THE INVENTION

In the art of dentistry, a negative impression is taken in a rubber-type impression material of the surface of the teeth and of adjacent portions of the jaw. From this negative impression a replica of the teeth and a master model can be reproduced. The impression is taken by placing the impression material in an impression tray which is pressed against the teeth of the patient. In the conventional method of producing a replica of a tooth, a dowel pin is guided manually into the tooth cavity formed within the negative impression. After the dowel pin is positioned at the desired height and angle relative to the center of this cavity, the impression tray is removed and filled with a die stone material and brought back to its original position relative to the dowel pin.

In carrying out the preceding steps, many manipulations were required which were time-consuming and sometimes ineffective, since the securing of the dowel pins relative to the impression tray presented a most difficult problem. In addition, the known methods for making replica of teeth required laboratory technicians with great dexterity.

SUMMARY OF THE INVENTION

In general, a magnetic apparatus is provided which allows easy and secure positioning and indexing of one or more magnetic tools relative to a workpiece. The workpiece can be removed for auxiliary operations and returned to its original position without losing the fidelity in the spacial relationship between the tool and the workpiece.

In particular, the apparatus finds special application in the dental art as a doweling jig for maintaining mechanically the correct positional relationship between dowel pins and a tooth impression. The jig includes a base and a horizontal magnetic table movably disposed adjacent to the base. A tool of magnetic material comprising a vertically reciprocable dowel pin holder is placed on the table at a position which allows the dowel pin to remain at the correct positional relationship between the dowel pin and the impression tray. The impression tray is placed in a section of a mold which is supported on a support rotatably mounted on the base. When said correct positional relationship is achieved, the position of the magnetic table is indexed and the table is lifted.

The impression tray is then removed, filled with a die stone, and returned to its original position on the support. The table is lowered back to its indexed position, thereby causing the dowel pin to penetrate into the yet soft die stone and to assume its original position within the tooth cavity.

The magnetic table is movably mounted on vertical posts. After the die stone hardens, the magnetic table is raised. The lifting of the magnetic table, after the die stone hardens, frees the dowel pin from its tool holder. The magnetic attraction between the table and the magnetic tool assures the positional relationship between the tool and the table, while the table is moved from one vertical position to another. The section of the mold which receives the impression tray also thereafter serves to form a master tooth model.

Accordingly, it is an object of the present invention to provide a magnetic tool-positioning table which eliminates most of the difficulties experienced with devices of this type. Means are provided to simplify the task of moving the magnetic table relative to the workpiece-support table, while permitting the table to rest upon a fixed solid indexing surface during the working operation.

A feature of the present invention resides in the provision of a workpiece-support table which may be moved from one angular position to another to thereby properly locate the workpiece relative to a tool. During the working operation, magnetic attraction holds the tool in a set position while allowing manual lateral adjustments of the tool.

Further features of the present invention, especially applicable to the dental art, reside in the provisions of: Indexing means for roughly locating the position of the magnetic table; and a dowel pin holder for allowing a fine adjustment between the dowel pin and the impression. The holder includes a socket which frictionally receives the tool therein and which is positioned directly opposite to the impression cavity. The pin holder is vertically movable in a recess formed by the magnetic table.

Other objects and advantages of this invention will become more apparent from the following detailed description and attached sheets of drawings wherein a preferred form of the invention is illustrated.

BRIEF DESCRIPTION OF THE DRAWINGS

FIG. 3 is a side view in elevation of the apparatus shown in FIG. 1 with certain parts shown in cross section;

FIG. 4 is a top view of the master model while it is still in its mold;

FIG. 5 is a section view taken on line 5—5 in FIG. 4; and

FIG. 6 is a detail view in cross section showing the frictional engagement between the dowel pin and the socket in the dowel holder.

Figure 1:
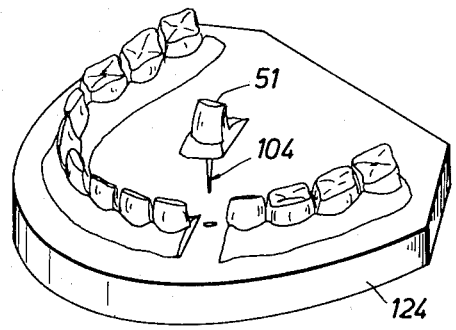
FIG. 1 is a perspective view of a master tooth model which can be produced with the apparatus of this invention.
Figure 2:
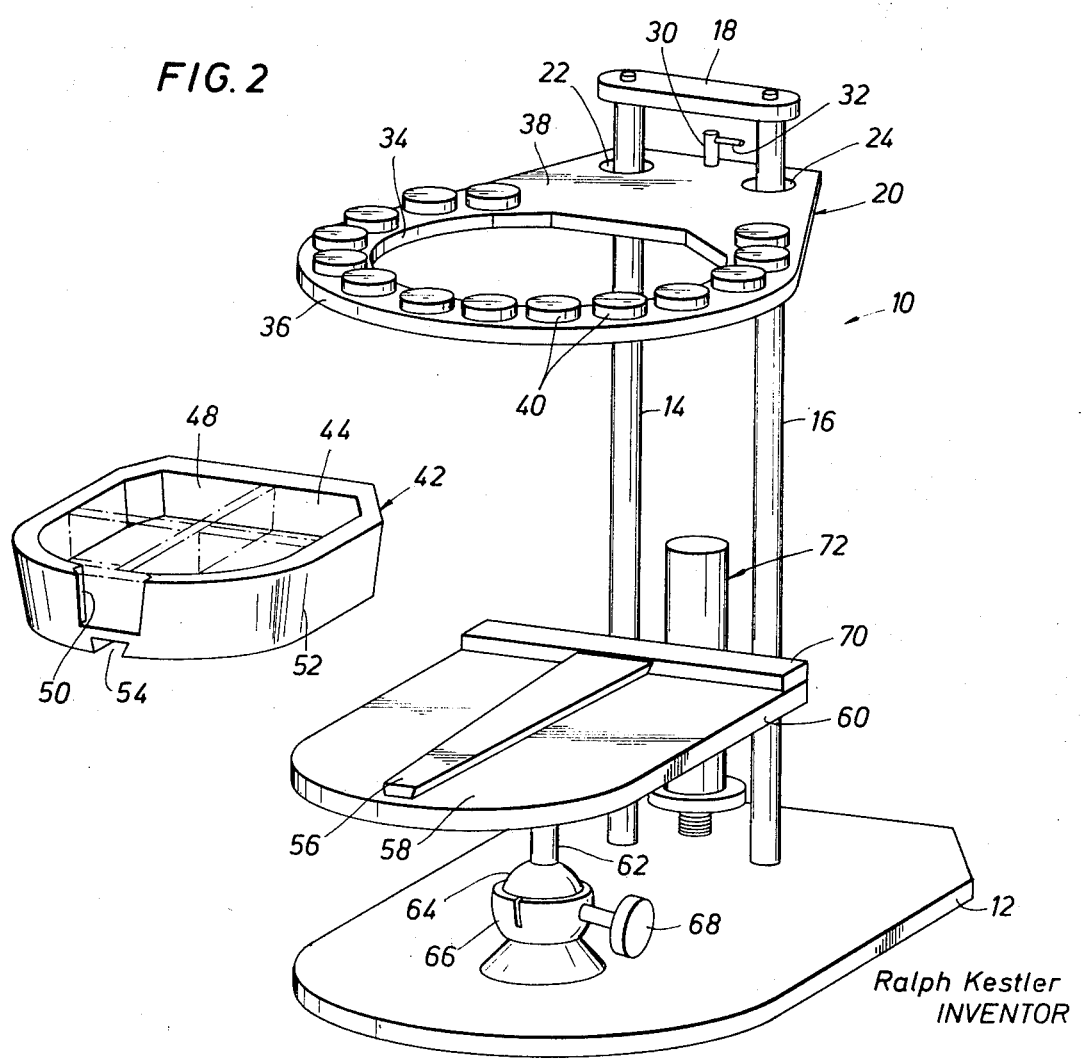
FIG. 2 is a perspective view of the apparatus of this invention showing the magnetic table in its elevated position and the working mold lifted from its support table.

As illustrated in the drawings, and particularly in FIGS. 1 and 3, the apparatus 10 includes a base 12 which can be made of metal or of a suitable plastic material. Two spaced-apart posts 14 and 16 extend vertically from base 12 and are rigidly secured to each other by a crossbar 18. A horizontal, magnetic, tool-support table 20 can ride up and down on posts 14 and 16 over suitable sleeve bearings 22 and 24 which are fastened to the underside 26 of table 20 as by welding 28. Table 20 can be raised to an upper position and secured to crossbar 18 by a rotatable latch 30 which has a handle 32 for rotation over the upper surface of crossbar 18.

Table 20 defines near-circular opening 34, an annular portion 36, and a solid portion 38. The downwardly extending bearings 22 and 24 are secured to portion 38. The entire table 20 can be a permanent magnet. For convenience of construction, however, a plurality of permanent magnets 40 are disposed around the annular portion 36. The number of magnets employed is determined from the number of tools which it is desired to support on table 20. The diameter of opening 34 is such as to allow free access to any portion of the workpiece, which for dental applications would be a bottom, half-mold 42.

The geometry of mold 42 is such as to define an inner chamber 44 for receiving an impression tray 46 housing an impression 47. Inner chamber 44 may be conveniently divided into four quadrants 48 to accommodate more than one impression tray 46. A side window 50 in the vertically extending wall 52 facilitates the manipulation of the impression tray 46 in mold 42. The underside of mold 42 is provided with a U-shaped groove 54 for slidably engaging a correspondingly-shaped tongue 56 provided on the upper surface 58 of a workpiece support table 60.

Table 60 is supported on a center post 62. Post 62 is fixedly anchored into a ball 64 which is rotatably mounted in a semi-spherical socket 66 positioned slightly offcenter on, and fixedly secured to, base 12. A knob 68 in socket 66 allows ball 64 to become locked in place after table 60 is desirably positioned relative to table 20.

Mold 42 slides on table 60 into an abutting engagement with a retainer wall 70. An indexing means 72 is provided to roughly adjust the position of table 20 in vertical elevation relative to the workpiece or mold 42. Indexing means 72 includes a threaded post 74 welded to base 12 at 76. A cylinder 78 having an inner thread 80 can be made to turn on post 72 by rotating a circular knob 82, thereby lowering or raising table 20 relative to base 12. The underside 26 of table 20 is securely supported on the solid top surface 84 of cylinder 78.

A tool generally designated as 90 of a magnetic material is snugly, but adjustably, supported by magnetic table 20. Tool 90 includes a radially extending flat handle 92 coupled to a vertically extending threaded inner cylinder 94. Cylinder 94 extends from one end 96 of handle 92 through the opening 34 of table 20. A finely-threaded tool holder or rod 98 is threadably engaged by cylinder 94. The lower end 100 of holder 98 provides a socket 102 for frictionally receiving the upper end 103 of a commercially available dental dowel pin 104. The frictional engagement between socket 102 and pin 104 is at 106. A center cylindrical opening 108 makes a releasable engagement with the top cylindrical portion 110 of dowel pin 104.

In operation of the apparatus thus far described, the impression 47 defines a negative or cavity 49 which represents the outer surface of a tooth 51 (FIG. 1). The mold 42 slides on support table 60 against the retaining wall 70. Tool 90 is positioned on a particular magnet 40. Socket 102 is loaded with a dowel pin 104. Table 20 is then desirably positioned relative to base 12 by rotating cylinder 78. Thereafter, dowel pin 104 can be raised or lowered into cavity 49 by rotating rod 98 inside cylinder 94. The angular spacial relationship between the longitudinal axis of dowel pin 104 and the vertical axis of cavity 49 can be adjusted by rotating table 60 on the ball socket 66. Handle 92 of tool 90 can be moved in the horizontal plane of table 20 by overcoming the magnetic attraction between it and magnet 40. The radial movement of tool 90 allows to adjust for variations in the arch of the mouth.

After the dowel pin 104 is thus positioned at the proper elevation and angle relative to cavity 49, table 20 is lifted on posts 14 and 16 to its elevated, nonoperative position and secured by handle 32 to crossbar 18. Bottom mold 42 is now removed from table 60 and the inner chamber 44 filled with a die stone material 53 (FIGS. 4 and 5). Before material 53 hardens, mold 42 is repositioned on support table 60 to its original position. Table 20 is lowered to engage the top surface 84 of cylinder 78 thereby forcing dowel pin 104 into the still soft stone material 53. Dowel pin 104 is now at precisely the same spacial position relative to cavity 49 as the indexed position it assumed prior to the lifting of table 20.

Mold 42 is now allowed to sit on table 60 until the die stone material 53 hardens. Thereafter, dowel pin 104 becomes securely anchored in cavity 49. Table 20 is again lifted to its elevated position thereby breaking the frictional engagement 106 between pin 104 and socket 102. The bottom mold 42 can now be removed from table 60 and fitted with a mating top mold 120 which fits over mold 42 and defines a center recess 122. A model stone material 124 is poured through recess 122. A rubber tip 126 is inserted on the cylindrical end 110 of pin 104 to provide an indication of the position of the pin 104 within the stone material 124. After the stone material 124 hardens, it is removed from the top mold 120 and shaped as shown in FIG. 1. The desired replica or model tooth 51 can then be separated from the remaining model teeth in conventional manner.

It should be understood that it is not intended to limit the invention to the above described forms and details, and that the invention includes such other forms and modifications as are embraced by the scope of the appended claims.

What is claimed is:

1. A tool positioning apparatus for positioning a magnetic tool relative to a workpiece, said apparatus comprising:
   base means;
   a magnetic table moveably disposed adjacent to said base means and providing a work surface for supporting a magnetic tool;
   guide means coupled to said base means to permit movement of said magnetic table relative to said base means;
   a workpiece support member on said base means for supporting said workpiece; and
   indexing support means to support and index the position of said magnetic table when said tool is in an operative condition on said table relative to said workpiece and to allow said table to move up and down relative to said base means without changing the spacial relationship between said tool and said workpiece.

2. The apparatus of claim 1 wherein,
   said workpiece support member includes means for adjusting the angular position of said member relative to said base means.

3. The apparatus of claim 1 wherein said workpiece is a mold.

4. The apparatus of claim 2 wherein,
   said magnetic tool has a magnetic portion horizontally disposed on said table, and another portion vertically and downwardly projecting from said table toward said workpiece support member.

5. The apparatus of claim 4 wherein,
   said vertically projecting portion defines a holding section.

6. The apparatus of claim 5 and further including:
   a dowel pin removably insertable in said holding section.

7. The apparatus of claim 3 wherein said mold is slidably mounted on said support member.

8. The apparatus of claim 6 wherein,
   said vertically protecting portion is movably mounted relative to said horizontal portion, thereby allowing a fine vertical adjustment of said dowel pin relative to said workpiece.

9. The apparatus of claim 8 wherein,
   said guide means include at least one vertical post extending from said base means; and
   said magnetic table being mounted for reciprocating movement on said post.

10. The apparatus of claim 7 wherein said mold defines a chamber adapted to receive a dental impression tray.

11. The apparatus of claim 1 and further including:
    a plurality of magnetic tools positioned on said table, each tool being adapted to hold a dowel pin.

12. The apparatus of claim 10 wherein,
    said mold includes a bottom portion and a top portion, said top portion allowing the casting of a master tooth model carrying one or more tooth replica.

13. The apparatus of claim 8 wherein,
    said vertically extending portion includes a threaded tubular member.

* * * * *